United States Patent [19]
Maksimovic et al.

[11] Patent Number: 5,867,379
[45] Date of Patent: Feb. 2, 1999

[54] NON-LINEAR CARRIER CONTROLLERS FOR HIGH POWER FACTOR RECTIFICATION

[75] Inventors: Dragan Maksimovic; Robert W. Erickson; Yungtaek Jang, all of Boulder, Colo.

[73] Assignee: University of Colorado, Boulder, Colo.

[21] Appl. No.: 371,822

[22] Filed: Jan. 12, 1995

[51] Int. Cl.$^6$ .............................. G05F 1/46; H02P 13/00
[52] U.S. Cl. ............................................. 363/89; 323/222
[58] Field of Search ................................. 363/21, 89, 95; 323/222, 285

[56] References Cited

U.S. PATENT DOCUMENTS

| | | |
|---|---|---|
| 3,659,184 | 4/1972 | Schwarz . |
| 4,974,141 | 11/1990 | Severinsky et al. ....................... 363/81 |
| 4,985,821 | 1/1991 | Cohen . |
| 5,001,620 | 3/1991 | Smith ........................................ 363/89 |
| 5,003,454 | 3/1991 | Bruning .................................... 363/81 |
| 5,291,382 | 3/1994 | Cohen . |

OTHER PUBLICATIONS

1993 IEEE 0–7803–0982, to Tang et al. "Power Factor Correction With Flyback Converter Employing Charge Control".
Cherry Semi–Conductor–Application "Control IC For Near Unity Power Factor in SMPS".
Oct. 1989 Power Conversion Proceedings "Design of a 1KW Power Factor Correction Circuit".
May 1994 IEEE 0–7803–1456, Bazinat and O'Connor paper "Analysis And Design of a Zero Voltage Transitions Power Factor Correction Circuit".

Primary Examiner—Peter S. Wong
Assistant Examiner—Rajnikant B. Patel
Attorney, Agent, or Firm—Rick Martin

[57] ABSTRACT

This patent disclosure describes new non-linear carrier-pulse-width modulators for control of high power-factor boost rectifiers. In the new modulators, the switch duty ratio is determined by comparing a signal derived from the main switch current with a periodic, nonlinear carrier signal $v_c$ ($t$, $v_m$). The shape of the carrier is selected so that the resulting input current follows the input voltage, as required for unity-power-factor rectification. A slowly-varying modulating input $v_m$ can be used to adjust the power level and to regulate the output dc voltage. The controller based on the new non-linear-carrier modulator has a number of advantageous properties: sensing of the input line voltage is eliminated; for current shaping, only sensing of the power switch current is needed; current shaping does not require an error amplifier with feedback loop compensation; the multiplier in the voltage feedback loop is eliminated; and the converter operates in the continuous conduction mode. The controller is potentially well-suited for integrated-circuit implementation. It can be expected that a dedicated IC based on the feed-forward modulators disclosed here would be simpler and would require less i/o pins than ICs currently available for power-factor correction, while offering comparable or improved performance.

13 Claims, 7 Drawing Sheets

NON-LINEAR CARRIER CONTROLLERS FOR HIGH POWER FACTOR RECTIFICATION

FIELD OF INVENTION

The present invention relates to switched mode power supplies, mainly boost converters, used to achieve high power factor rectification of the input AC line voltage. A non-linear carrier is compared to a signal derived from the switch current to obtain the pulse-width modulation signal. The pulse-width modulation signal drives the switch such that unity power factor results.

BACKGROUND OF THE INVENTION

GLOSSARY

| | |
|---|---|
| Apparent Power | The RMS current times the RMS voltage in a load. |
| Boost Converter | A switching power supply with an input inductor that stores energy and a shunt switch in parallel with the load. Produces a higher voltage at the output. |
| Buck Converter | A switching power supply that has a switch in series with an inductive-capacitive filter. Produces an output voltage lower than the input voltage |
| Capacitor | A capacitor stores electric energy, blocks the flow of direct current, and permits the flow of alternating current to a degree depending on the capacitance and the frequency. The voltage across a capacitor cannot change instantaneously. Current changes lead voltage changes in a capacitor. The relationship between current and voltage is: I = C dV/dt. |
| Continuous Conduction Mode (CCM) | Operation of a converter such that switch turns on at non-zero current. |
| Converter | A circuit for converting DC to AC. A circuit for converting AC to DC. A circuit for converting DC to DC. |
| Current Injection Control (CIC) | Uses the instantaneous inductor current as part of the control signals. Same as Peak Current Mode Control. |
| Discontinuous Conduction Mode (DCM) | Opposite of CCM. The switch turns on at zero current. |
| Flyback Converter | A buck-boost switching power supply with a single switching transistor that eliminates the output inductor. Energy is stored in the transformer primary when the transistor is conducting. When the transistor is off (the flyback period) the energy is transferred to the transformer secondary and load. |
| Inductor | An inductor stores electric energy, blocks the flow of alternating current to a degree depending on the inductance and frequency and permits the flow of direct current. The current through an inductor cannot change instantaneously. The relationship between current and voltage is: V = L di/dt. |
| Peak Current Mode Control | Uses the instantaneous inductor current as part of the control signals. Same as Current Injection Control. |
| Power Factor | The ratio of true power to apparent power as a percentage. Power factor is equal to the cosine of the phase angle between the current and the voltage when both are sinusoidal. |
| Reactive Power | The imaginary portion of apparent power. |
| RMS | Root mean squared. |
| SMPS | Switched Mode Power Supply |
| Transformer | A component that consists of two or more inductors which are coupled together by magnetic induction. The current and voltage are transformed across the transformer without changing the frequency. $$\frac{V_{in}}{V_{out}} = \frac{N_{in}}{N_{out}} = \frac{I_{out}}{I_{in}}$$ |
| True Power | The real portion of apparent power. |

SUMMARY OF THE PRIOR ART

AC-to-DC power rectifiers convert electric power from AC utility lines into DC voltages needed by a majority of electronic systems, including computers, home, and industrial electronics.

Simple diode-bridge rectifiers pollute utility lines with large harmonic currents, which results in increased power losses and the inability to use all of the available power. Also, current harmonics may affect operation of sensitive equipment supplied from the same utility line. There exists a widespread need for high-quality rectification where AC power is taken with unity power factor and nearly zero current harmonics. The allowed level of current distortion is the subject of international regulations such as IEC-555-2 and IEEE-519.

Figure 1:
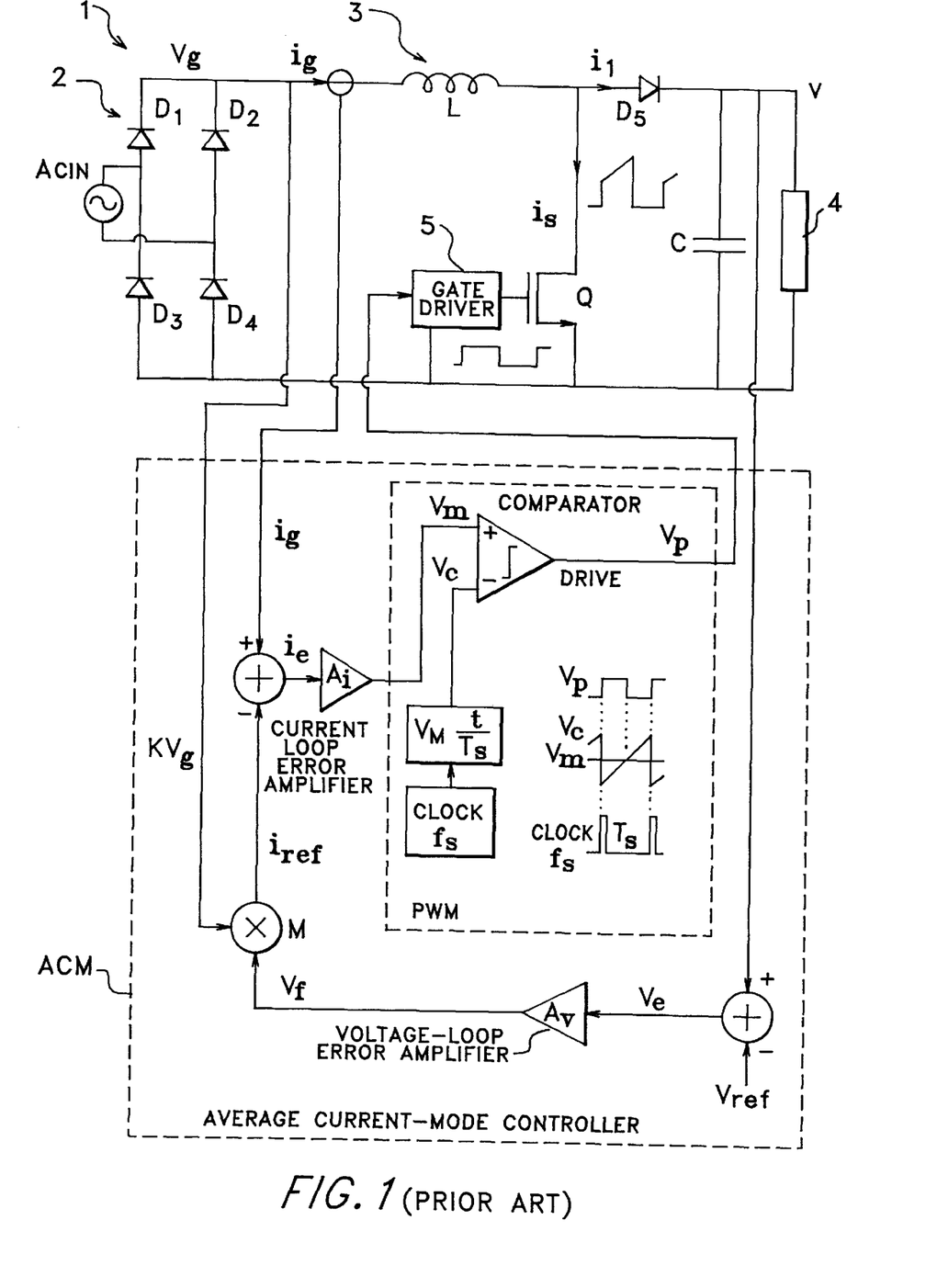
FIG. 1 (Prior Art) High-Power-Factor boost rectifier with a block diagram of the average current mode controller.

For single-phase high-power-factor rectification, the boost rectifier 1 shown in FIG. 1 (prior art) illustrates the most widespread choice. The AC line voltage (ACIN) is connected to the AC inputs of the full-wave rectifier 2, consisting of diodes D1–D4. The full wave rectified line voltage $v_g$ appears at the input of the boost converter 3. The boost converter 3 consists of inductor L, power transistor switch Q, diode D5, and the output filter/energy-storage capacitor C. Load 4 is connected to the output DC voltage V across the output capacitor C. The power transistor switch Q is periodically turned on and off at a switching frequency $f_s$ much higher ($f_s$ is at least 20 kHz) than the line frequency (50 or 60 Hz). The duty ratio D, defined as the ratio of the transistor on-time and the switching period $T_s$, is the control variable that can be used to achieve unity power factor rectification. The goal is to obtain the input current $i_g$ proportional to the full-wave rectified line voltage $v_g$, $$i_g = v_g / R_e \tag{1}$$

The proportionality constant $R_e$ is called the emulated resistance, because the unity-power-factor rectifier behaves as a resistive load toward the AC line ACIN.

FIG. 1 (prior art) also shows a block diagram of a frequently used control scheme called average current control. The average current mode controller ACM implements two feedback control loops in the boost rectifier. The first control loop is used to shape the input current $i_g$ to follow the input voltage waveform $V_g$. The second control loop is used to regulate the output DC voltage V.

In the current feedback loop, the input current $i_g$ is sensed and compared to the reference current $i_{ref}$ creating error signal $i_e$. The error signal is fed to the current-loop error amplifier $A_i$. The output of the error amplifier is a modulating signal $V_m$ for the pulse width-modulator PWM. In the modulator, the modulating signal $V_m$ is compared to a saw-tooth carrier signal $V_c$, periodic with period $T_s$. In one switching cycle, starting at t=0, the PWM carrier waveshape is given by the linear ramp $$v_c(t) = V_M \frac{t}{T_s} \quad (2)$$

where $V_M$ is constant, and $T_s$ is the switching period. The modulator output is a periodic square-wave waveform $V_P$, high when $V_c(t) < V_m$ and low when $V_c(t) \leq V_m$. Therefore, the duty cycle of the modulator output waveform, $$D = \frac{v_m}{V_M} \quad (3)$$

is proportional to the modulating input $V_m$. The modulator output controls the on/off state of the main power switch Q through a suitable gate driver circuit 5. The main power switch Q controls the switch current $i_s$ to achieve the duty ratio D.

To explain the operation of the current feedback loop, suppose, for example, that the sensed input current $i_g$ is lower than the reference current $i_{ref}$. The modulating signal $v_m$ increases, the switch duty ratio D increases, and the input current $i_g$ increases, reducing the initial error. In a well-designed current loop, the input current $i_g$ follows the reference proportional to the input voltage $v_g$, so that the rectifier operates with near-unity power factor.

In the voltage feedback loop, the output voltage V is sensed and compared to a DC reference $V_{ref}$. The error signal $V_e$ is fed to the voltage error amplifier $A_v$. The output of the error amplifier $V_f$ controls the scale factor between the input voltage $V_g$ and the current reference $i_{ref}$. A multiplier M is needed to implement this function, as shown in FIG. 1 (prior art). Assuming that the output of the error amplifier $V_f$ is a slowly varying signal, we have $$R_s i_{ref} = K v_g v_f = \frac{v_g}{R_e} \text{, where } R_e = \frac{1}{K v_f} \quad (4)$$

If, for example, the output voltage V is lower than the voltage reference $V_{ref}$, $v_f$ increases, the emulated resistance $R_e$ decreases, and the power taken from the AC source ACIN increases resulting in the increase in the output voltage V, which tends to reduce the error. In a well-designed voltage loop, the steady-state output DC voltage V is equal to the desired reference $V_{ref}$.

The widespread application of high-power-factor rectifiers, and the relative complexity of the control scheme described above, resulted in the creation of dedicated integrated circuits (IC's) based on the block diagram of FIG. 1. Commercial IC's are now available from Unitrode and Toko.

One of the problems associated with the average current control technique of FIG. 1 is the need for sensing the input current $i_g$ using a series sense resistor $R_s$. This results in increased power losses and an inability to isolate the controller ACM from the power stage 2. In the newest dedicated integrated circuits based on the average current control technique, only the switch current $i_s$ is sensed and the signal proportional to the input current $i_g$ is reconstructed artificially inside the IC chip. Thus, a more favorable current sensing can be applied at the expense of further increase in complexity of the integrated circuit.

In addition to the average current control techniques, several other control methods have been proposed and implemented in dedicated integrated circuits.

In the peak current control scheme, the switch current is sensed and compared to the reference signal proportional to the input line voltage. The peak current control has the advantage of sensing the switch current instead of the input line current. This eliminates the need for an error amplifier in the current-shaping loop. However, the resulting input current is distorted. Some improvements of the peak current control have been suggested in order to reduce the harmonic distortion in the input line current. However, it is still difficult to obtain optimum performance over wide ranges of load and line voltage variations. The multiplier and the voltage feedback loop are implemented as in FIG. 1. The peak current control is supported by dedicated integrated circuits from IC manufacturers such as Micro-Linear and Toko.

In the hysteretic control scheme, both peak and valley of the inductor current are controlled by turning the main power switch off when the current reaches the upper reference value, and on when the current reaches the lower reference value. Thus, the input line current is forced to stay always between the two reference levels. If the two reference values are proportional to the input line voltage, the low-frequency portion of the inductor current is proportional to the input voltage, as required. Disadvantages of the hysteretic controller are that the inductor current sensing is needed, and that the converter operates at variable switching frequency. The multiplier and the voltage error amplifier are used as in FIG. 1. This control scheme is supported by a dedicated integrated circuit from Cherry Semiconductors.

The simplest control technique is based on operating the boost converter in the discontinuous conduction mode (DCM). It has been shown that the DCM operation with fixed duty ratio results naturally in high power factor with relatively low harmonic distortion. The fixed duty ratio is controlled in the slow voltage loop to regulate the output voltage. Thus, no multiplier is needed in the controller implementation. Any of the standard PWM integrated circuits can be used to implement this control scheme. Unfortunately, the simplicity of the DCM control comes at the expense of much increased current stresses on the devices, increased conduction losses, and problems with filtering the large high-frequency current ripple from the inductor current. Also, the input current distortion cannot be completely eliminated. Therefore, the DCM control is preferred only in low-cost, low-power applications.

One modification of the DCM control is to operate the boost converter at the boundary between the continuous and discontinuous mode. This results in lower harmonic distortion, but at the expense of variable-frequency operation. Stesses are somewhat lower than in the DCM scheme, but are still high enough to invalidate the application of this control technique at higher power levels. This control scheme is also supported by dedicated integrated circuits from several manufacturers including Motorola and Silicon General.

The review of existing approaches to control of high-power-factor boost rectifiers shows that a control scheme that combines benefits of continuous conduction mode operation, switch-current sensing, simplicity of the DCM control, and low input current harmonic distortion, would be superior to any of the currently available solutions. Such control schemes are the subject of this patent disclosure. Below follows a summary of recent developments in the art.

1993 IEEE 0-7803-0982, 0/93 to Tang et al., describes a flyback converter using charge control to achieve power factor correction. This method does use the switch current to provide the resistive emulation. However, this method works only with the flyback configuration. The reference current is obtained as in FIG. 1 using a multiplier, and input voltage sensing. In the flyback converter the input current and the switch current are the same. This application does not use a non-linear carrier waveform.

Cherry Semi-conductor—Application Note CS-3810 Control IC for Near Unity Power Factor in SMPS discloses the 16 pin Cherry Semiconductor CS-3810 Power Factor Correction IC. This IC has two multipliers, sample and hold circuitry, and various protection circuitry, for over and under voltage. The input and output voltage and switch current are sensed on the chip. The control method is a hysteretic current mode control. When the inductor current reaches the commanded peak and valley levels, the switch turns OFF and ON respectively. The multipliers are used to establish the peak and valley levels. As a result, the switching frequency varies with amplitude of the input voltage.

October 1989 Power Conversion Proceedings Design of a 1 KW Power Factor Correction Circuit—Nalbant & Klein Micro Linear Corporation discloses the design and performance of a 1 KW power factor correction circuit using the ML4812 dedicated active power factor controller IC. Many aspects of the design are addressed such as the criteria for selecting the input inductor as well as other power components. System performance is discussed i.e. power factor and total harmonic distortion as a function of line voltage and load current. This IC (Micro-Linear ML4812) is in a 16 pin package. The IC senses the input voltage and current, the switch current, and the output voltage. The IC also has circuitry for over and under voltage protection. This IC implements the peak current control method. The reference for peak current is obtained as in FIG. 1 using an onboard multiplier. When this control scheme is used, lower power factor is achieved than using the control scheme of FIG. 1.

1994—IEEE 0-7803-1456-5/94 Bazinat and O'Conner paper analyzes the zero voltage transition boost converter for power factor correction and presents a method for optimal component selection. A complete circuit is shown featuring a new specifically designed control IC (Unitrode—UC3855). Practical design issues are discussed, and a design procedure is presented. Critical circuit waveforms are shown, and performance with and without zero voltage transitions are compared. This IC has an onboard multiplier and is in a 20 pin package. The control scheme implemented in this IC is the same as used in FIG. 1. The IC synthesizes the boost inductor current from a current transformer measurement of the main switch current. Vout and Vin are both sensed in the IC.

U.S. Pat. No. 4,985,821 (1991) to Cohen discloses an invention which does not teach solving unity power factor for rectifiers. Instead, it discloses circuits for indirectly sensing and controlling the output current of switching type DC—DC converters. The circuit utilizes capacitance which follows the output voltage by being responsive to switching current during the conduction period and being controllably discharged as a function of output voltage during the non-conduction period. The result reflects the output current through both cycles of the switch. The present invention differs from this technique in that the present invention's capacitor is used to integrate the switch current over the switch cycle. This integrated switch current is then compared to a periodic non-linear carrier waveform constructed so that the input current follows the input line voltage as required for unity power factor rectification.

U.S. Pat. No. 5,291,382 (1994) to Cohen discloses a topology featuring the following characteristics:
 Low voltage stresses on both switching devices and output rectifiers.
 Low ripple voltage.
 Inherent capability of operating with zero voltage switching.
 Optimal utilization of the magnetic materials used in the circuit.

All of the above principal characteristics are achieved by merging a bi-directional buck boost converter and a double ended, buck derived converter in a single power conversion structure. This topology switches when the input inductor current reaches a peak or valley. As a result, the switching frequency varies as the input voltage and the load current.

U.S. Pat. No. 3,659,184 (1972) to Schwarz discloses an electronic signal conversion device. The device is useful for converting analog signals to modulation signals. This device uses a fixed reference source not a non-linear carrier controller.

TRANSITION

All of the above prior art requires complex IC packages with multipliers, input current, and voltage sensing.

The present invention requires sensing only the switch current and output voltage. Thus, the present invention can be implemented in a simpler and cheaper integrated circuit.

SUMMARY OF THE INVENTION

The primary object of the present invention is to provide a unity power factor at the input of a power supply by only sensing the switch current and the output voltage.

New non-linear carrier pulse-width modulators for control of high-power-factor boost and other rectifiers are disclosed. In the new modulators, the main power switch turn-off time and the switch duty ratio are determined by comparing a signal derived from the main switch current with a periodic, nonlinear carrier signal $v_c(t,v_m)$. Two versions of modulators are described: the charge non-linear carrier modulator, where the signal proportional to the integral of the switch current is compared to the carrier, and the peak current non-linear carrier modulator, where the signal proportional to the switch current is compared to the carrier.

Compared to conventional modulators used to control switch-mode power supplies, the distinctive feature of the new modulators is the non-linear carrier signal $v_c(t,v_m)$. The carrier signal is periodic with the period equal to the switching period, and its waveshape is determined so that the resulting input line current is proportional to the input line voltage, as required for unity-power-factor rectification. The emulated resistance and, therefore, the power level can be adjusted by a slowly-varying modulating signal $v_m$. Simple schemes for carrier synthesis in the two modulators are also described.

The non-linear carrier modulators offer several advantages over existing approaches in constructing controllers for high-power-factor boost rectifiers:

1. The controller based on one of the non-linear carrier modulators is simpler because:
    the input line voltage sensing is eliminated;
    output voltage regulation can be achieved without the multiplier in the voltage feedback loop;
    error amplifier and loop compensation are not required in the current-shaping loop.
2. The current-shaping is based on the switch current sensing, which is the most favorable option for practical implementation. Compared to sensing the input line or inductor current, the switch current sensing is more efficient and less noise sensitive. It also offers the possibility of electrical isolation between the controller and the power stage.
3. Since no line voltage sensing is needed, the controller is suitable for boost configurations where the input ac line and the controller are electrically isolated or where the controller reference ground is floating with respect to the ac line.

4. The controller is suitable for boost rectifiers operating in the continuous conduction mode, which is the preferred mode of operation because of the lower noise levels and lower component stresses compared to the discontinuous conduction mode.

5. The controller is well-suited for a low-cost integrated-circuit based on the non-linear carrier modulators disclosed here. The controller would be simpler and would require less i/o pins than currently available integrated circuits, while offering comparable or improved performance.

The same benefits are achieved with either one of the two non-linear carrier modulators described in this disclosure. The charge non-linear carrier modulator has the advantage of somewhat simpler carrier signal, and better current-sense noise immunity because the sensed switch current is integrated. The peak current non-linear carrier modulator has the advantage of inherent instantaneous over-current protection for the transistor switch.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Assumptions

In the derivation of the new modulators, several simplifying assumptions are introduced, all of which are satisfied in a well-designed boost rectifier:

1. The converter operates in the continuous conduction mode;
2. The switching frequency $f_s$ is much higher than the line frequency $f_l$ 3. The input voltage $v_g$ is a full-wave rectified sinewave. During one switching interval, the input voltage can be considered constant;
4. The output voltage V is approximately constant during one half line cycle;
5. There are no power losses in the converter.

In the discussion that follows, a bar above a variable indicates that the variable is averaged over a switching cycle:

$$\bar{x}(t_k) = \frac{1}{T_s} \int_{t_k}^{t_k + T_s} x(\tau) d\tau \approx \bar{x}(t) \quad (5)$$

Averaging a switching waveform in this manner yields the low-frequency components of the waveform and is a well-accepted approximation in the Power electronics field.

Charge Non-Linear Carrier Modulator

In this section a modulator is derived where the cycle-by-cycle average of the switch current is compared to a judiciously selected non-linear carrier waveform. A control scheme based on evaluating the cycle-by-cycle average of a switching waveform was proposed in Schwarz (184). More recently, a similar approach to control of switch-mode power converters, known as charge control, was presented in Tang et al. (IEEE PESC, 1992, pp. 503–511). The distinctive feature of the charge feed-forward modulator described here is that the cycle-by-cycle average of the switch current is compared to a periodic non-linear carrier waveform constructed so that the input current in the boost rectifier automatically follows the input line voltage, as required for unity power factor rectification.

When the boost converter of FIG. 1 operates in the continuous conduction mode, relations among the power stage variables and the duty ratio D can be easily derived for idealized steady-state conditions:

$$\bar{i}_s = D \bar{i}_1 \quad (6)$$

$$v_g = (1-D)V \quad (7)$$

The control objective for the input current is:

$$i_g = \bar{i}_1 = \frac{v_g}{R_e} \quad (8)$$

Combining Eqs. (6), (7), and (8) we have:

$$\bar{i}_s = \frac{v_g}{R_e} D, \quad (9)$$

$$\bar{i}_s = \frac{V}{R_e} D(1-D) \quad (10)$$

The last relation can be written as:

$$\frac{1}{T_s} \int_{t_k}^{t_k + DT_s} i_s(\tau) d\tau = \frac{V}{R_e} D(1-D) \quad (11)$$

Therefore, if the duty ratio D is determined such that Eq. (11) is satisfied in each switching cycle, the input current $i_g$ will follow the input voltage $v_g$ as required for unity power factor rectification. Next, we demonstrate that a modulator can be constructed to result in the desired solution for D in each switching cycle.

Assume that time t is reset to zero at the beginning of a switching cycle and define the running duty ratio d(t) as the ratio of the interval elapsed from the beginning of the switching cycle and the switching period:

$$d(t) = \frac{t}{T_s} \quad (12)$$

At the turn-off instant $t_{off}$, we have that $D=d\,(t_{off})=t_{off}/T_s$. To solve for D in Eq. (11) we construct two time-varying functions starting from t=0 at the beginning of each switching cycle: signal $v_g$ proportional to the running integral of the switch current starting from zero at the beginning of the switching cycle;

$$v_q(t) = R_s \frac{1}{T_s} \int_0^t i_s(\tau)d\tau, \quad (13)$$

and the carrier signal $v_c(t)$, $$v_c(t) = v_m \frac{t}{T_s} \left(1 - \frac{t}{T_s}\right), \quad (14)$$

where $R_s$ is the equivalent current-sensing resistance, and $v_m$ is the slowly-varying modulating input. The turn-off instant $t_{off}$ is the solution to $$v_c(t_{off}) = v_q(t_{off}), \quad (15)$$

which requires only a comparator circuit in a practical implementation.

The rectifier emulated resistance is given by $$R_e = R_s \frac{V}{v_m}, \quad (16)$$

Therefore, the slowly-varying modulating input $v_m$ can be used to control the emulated resistance and the power level in the output voltage regulation loop without need for a multiplier.

Charge Non-Linear Carrier Controller

Figure 2:
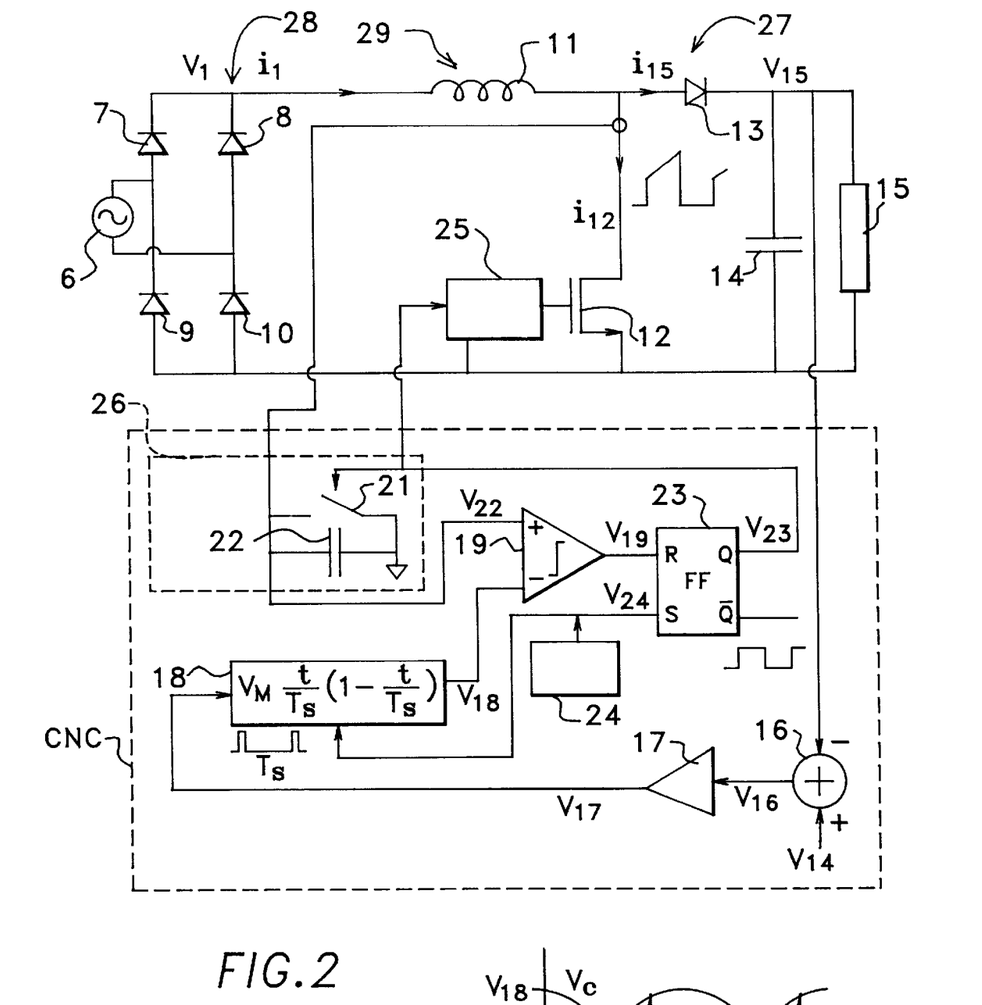
FIG. 2 is a high power factor boost rectifier with a charge non-linear carrier controller.

FIG. 2 shows a charge non-linear carrier controller 27 configured as a boost rectifier.

Figure 3:
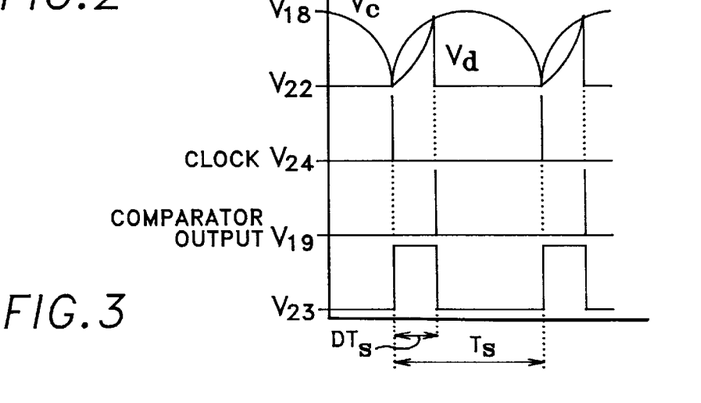
FIG. 3 is the key waveform of the boost rectifier shown in FIG. 2.

FIG. 3 shows typical switching waveforms for the charge non-linear controller shown in FIG. 2.

The following is a discussion of the circuit of FIG. 2 and the waveforms of FIG. 3.

The AC line voltage 6 is connected to the AC inputs of the full-wave diode bridge rectifier 28 consisting of four diodes 7–10. The output of the diode bridge rectifier 28 generates the full wave rectified line voltage $V_1$ and input current $i_1$ at the input of the boost converter 29. The boost converter 29 consists of inductor 11, power transistor 12, diode 13, and the output capacitor 14. The load 15 is connected to the output dc voltage $V_{15}$ across the output capacitor 14. The boost converter 29 is controlled by the charge non-linear controller NLC.

The main power transistor 12 is periodically turned on and off at a switching frequency $f_s$ much higher than the line frequency by the gate driver 25. At the beginning of a switch cycle, narrow clock pulse $V_{24}$, generated by the clock 24, sets the set/reset flip-flop 23. When the flip flop 23 is set $V_{23}$ goes high turning on the power transistor 12 via the gate driver 25. $V_{23}$ also opens the switch 21 allowing the integrator capacitor 22 to charge. The integrator capacitor 22 is located in the integrator with reset 26, thus the switch cycle is started.

Figure 4:
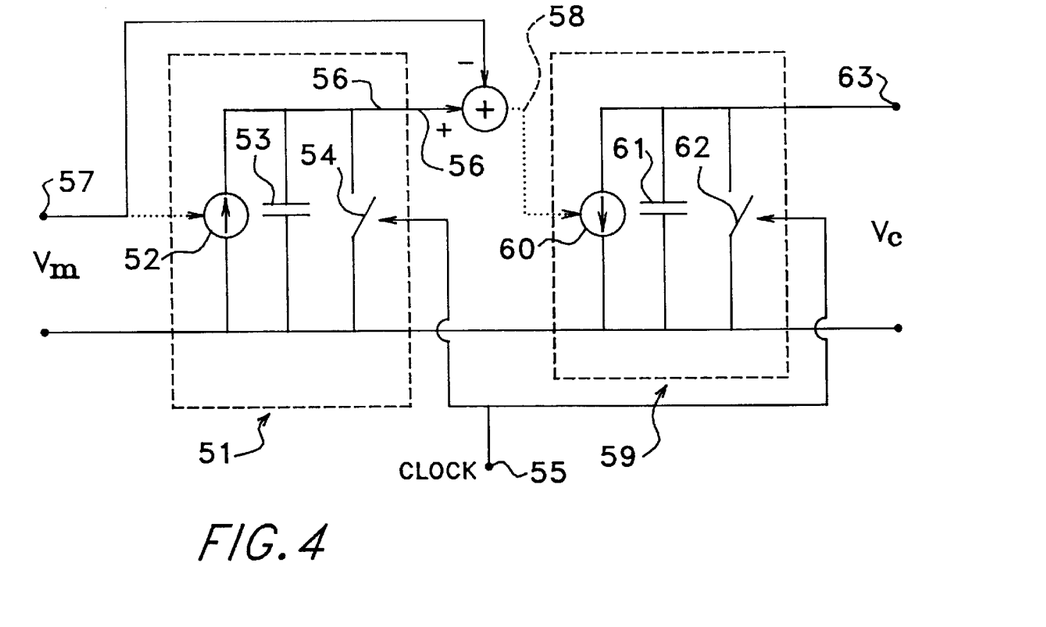
FIG. 4 is a block diagram of the carrier generator for the charge non-linear carrier controller of FIG. 2.
Figure 5:
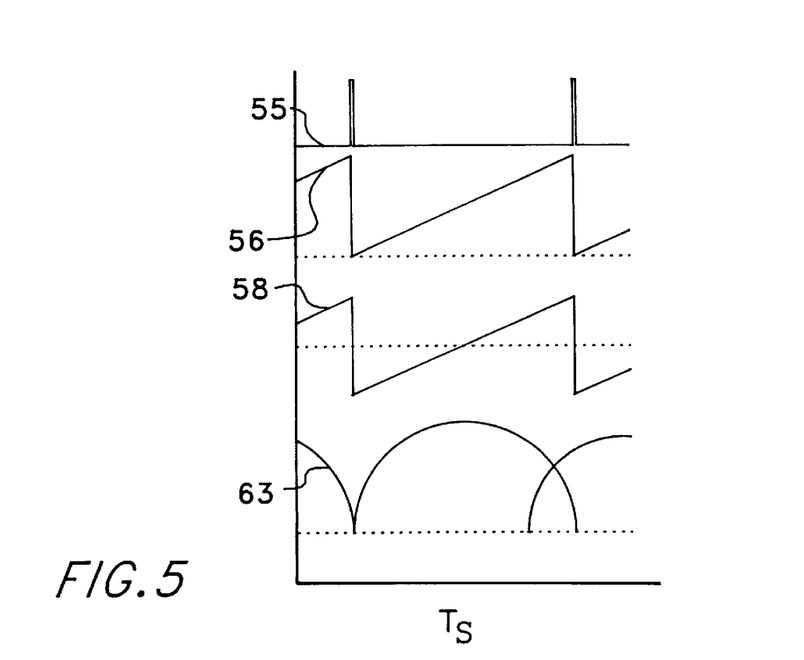
FIG. 5 is the key waveforms of the modulator of FIG. 4.

The output voltage $V_{15}$ is summed with the reference voltage $V_{14}$ by the summing junction 16. Summing junction 16 produces an error voltage $V_{16}$ which is multiplied by the gain of the voltage loop error amplifier 17 to obtain the modulating input $V_{17}$. The carrier generator 18, which is also reset by the clock signal $V_{24}$, transforms the modulating input $V_{17}$ into the carrier signal $V_{18}$ as shown in FIGS. 4 and 5. The power transistor current $i_{12}$ is sensed and used to charge the integrator capacitor 22 to produce integrator output signal V22. The integrator output signal $V_{22}$ is compared to the carrier signal $V_{18}$ by comparitor 19. When the integrator output signal $V_{22}$ reaches the voltage level of the carrier signal $V_{18}$, the comparitor output $V_{19}$ resets the flip flop 23, the power switch 12 is turned off, and the integrator capacitor 22 is reset to zero, thus ending the switch cycle.

Charge Non-Linear Carrier Waveform Generator

The key component of the charge non-linear carrier modulator of FIG. 2 is the generator of the nonlinear carrier waveform $v_c(t)=v_m(t/T_s)(1-t/T_s)$, where $v_m$ is a slowly-varying modulating input, and $T_s$ is the switching period.

Various circuit techniques can be used to synthesize the signal $v_c(t)$. Here, a simple method based on integration of a linear ramp signal is described. A block diagram of the $v_c(t)$ generator 18 of FIG. 2 is shown in FIG. 4, together with waveforms illustrating the operation shown in FIG. 5.

If the desired waveform $V_c(t)$ 163 is differentiated, we get $$\dot{V}_c(t) = \frac{1}{T_s}\left[V_m - 2\frac{V_m t}{T_s}\right].$$

First a linear ramp signal (56) $v_1(t)=2v_m(t/T_s)$ is generated by an integrator with reset 51 using a controlled current source 52 charging a capacitor 53. The capacitor 53 is discharged to zero using a switch 54 controlled by the clock input signal 55. The output of the integrator with reset 51 is the linear ramp signal $v_1(t)$ 56.

The second step is to subtract $v_m$ 57 from $v_1(t)$ 56, obtaining $V_2(t)$ 58 as shown in the block diagram. Finally, $v_c(t)$ 63 is obtained by integrating $v_2(t)$ 58, $$v_2(t) = v_1(t) - v_m \quad (17)$$

$$v_c(t) = -\frac{1}{T_s}\int_0^t v_2(r)dr,\ 0 \le t \le T_s, \quad (18)$$

which is the function of the second integrator with reset 59 comprising current source 60, capacitor 61, and switch 62. Both integrators 51 and 59 are reset to zero by the clock signal 55 at the beginning of every switching cycle to ensure the correct zero initial conditions.

Peak Current Non-Linear Carrier Modulator

A non-linear carrier modulator is derived wherein the sensed switch current is compared to a judiciously selected non-linear carrier waveform. As discussed in the charge non-linear carrier modulator, the sensed switch current is also used in the peak-current control schemes for power-factor correction (as shown in Nalbant et al. Power Conversion, October 1989 Proceedings, pp. 121–134 and the TOKO IC Data Book 1993 power factor controllers: TK81854 and TK84812). The distinctive feature of the peak current feed-forward modulator described here is that the sensed switch current is compared to the periodic nonlinear carrier waveform constructed so that the input current in the boost rectifier automatically follows the input line voltage, as required for unity power factor rectification.

The derivation of the peak current feed-forward modulator starts with the relation between the peak switch current $i_p$ and the average input current in the boost converter:

$$i_p = \bar{i}_1 + \frac{V_g}{2Lf_s} D = i_g + \frac{V_g}{2Lf_s} D. \tag{19}$$

Using the same approach as in the charge non-linear carrier modulator, we can eliminate $i_g$ and $v_g$:

$$i_p = \frac{V}{R_e}(1-D) + \frac{V}{2Lf_s} D(1-D) \tag{20}$$

In the feed-forward modulator based on Eq. (20), the signal $R_s i_s$ proportional to the instantaneous switch current is compared with the carrier:

$$v_c(t) = v_m(1-t/T_s) + K(t/T_s)(1-t/T_s) = (v_m + Kt/T_s)(1-t/T_s), \tag{21}$$

where $v_m$ is the slowly-varying modulating input, $K = VR_S/2Lf_S$, and $R_S$ is the equivalent current-sensing resistance. The rectifier emulated resistance is given by $$R_e = R_s \frac{V}{v_m} \tag{22}$$

Peak Current Non-Linear Carrier Controller

Figure 6:
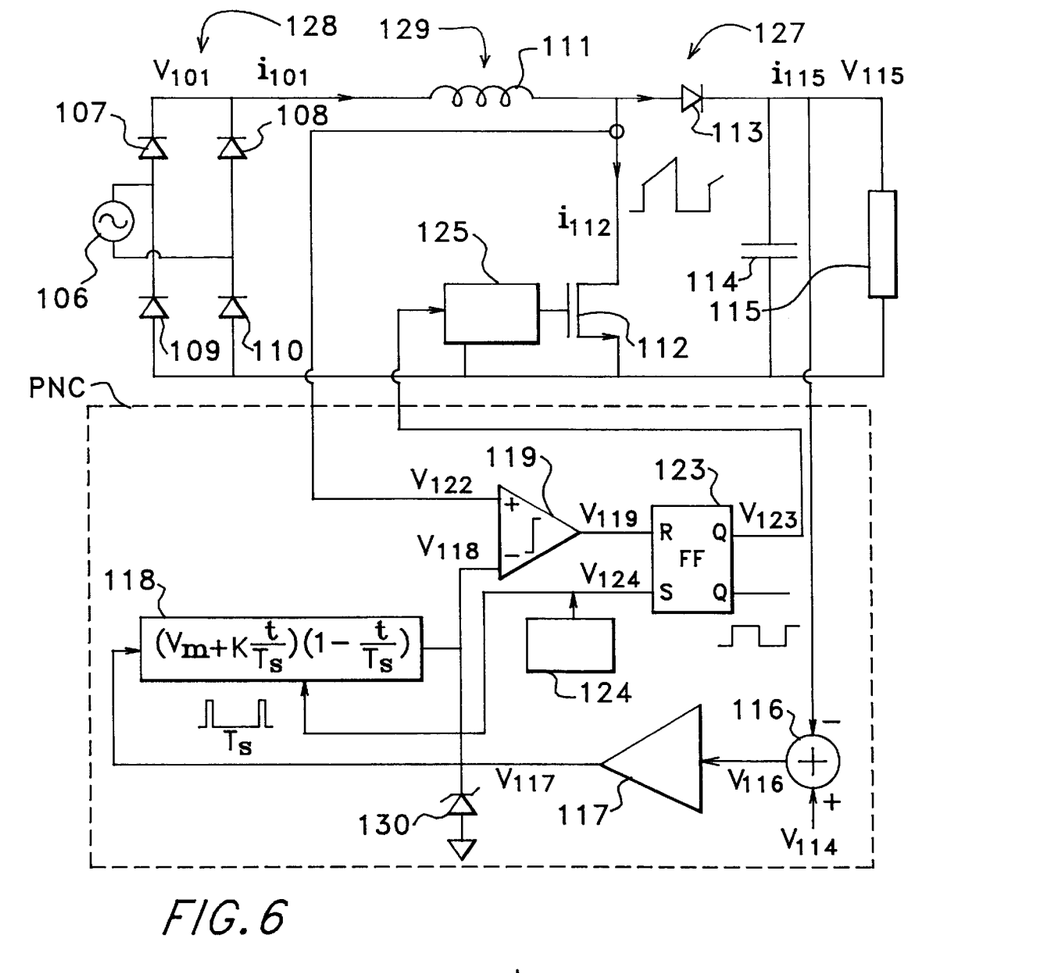
FIG. 6 is a high power factor boost rectifier with a peak current non-linear carrier controller.

FIG. 6 shows a peak current non-linear carrier controller 127 configured as a boost rectifier.

Figure 7:
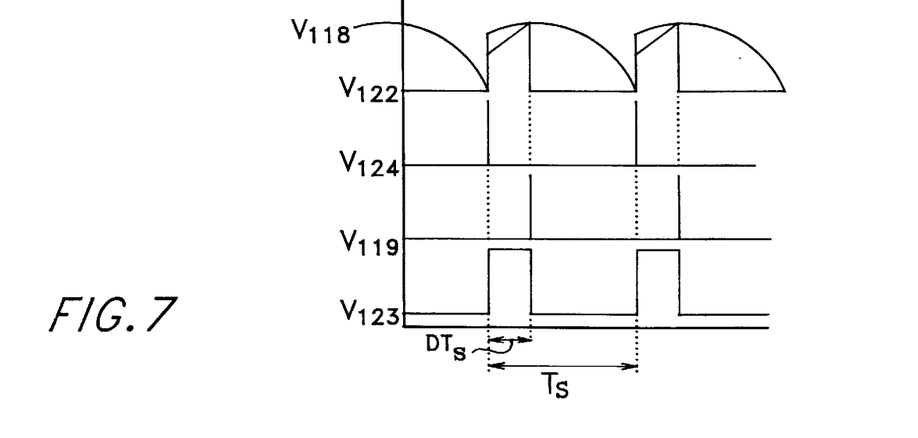
FIG. 7 is the key waveform of the boost rectifier shown in FIG. 6.

FIG. 7 shows typical switching waveforms for the peak current non-linear controller shown in FIG. 6.

The AC line voltage 106 is connected to the AC inputs of the full-wave diode bridge rectifier 128 consisting of four diodes 107–110. The output of the diode bridge rectifier 128 generates the full wave rectified line voltage $V_{101}$ and input current $i_{101}$ at the input of the boost converter 129. The boost converter consists of inductor 111, power transistor 112, diode 113, and the output capacitor 114. The load 115 is connected to the output dc voltage $V_{115}$ across the output capacitor 114. The boost converter 129 is controlled by the peak current non-linear carrier controller PNC.

The main power transistor 112 is periodically turned on and off at a switching frequency $f_s$ much higher than the line frequency by the gate driver 125. At the beginning of a switch cycle, a narrow clock pulse $V_{124}$, generated by the clock 124, sets the set/reset flip-flop 123. When the flip flop 123 is set $V_{123}$ goes high turning on the power transistor 112 via the gate driver 125, thus the switch cycle is started.

The output voltage $V_{115}$ is summed with the reference voltage $V_{114}$ by the summing junction 116. Summing junction 116 produces an error voltage $V_{116}$ which is multiplied by the gain of the voltage loop error amplifier 117 to obtain the modulating input $V_{117}$. The carrier generator 118, which is also reset by the clock signal $V_{124}$, transforms the modulating input $V_{117}$ into the carrier signal $V_{118}$ as shown in FIGS. 6 and 7. The power transistor current $i_{112}$ is sensed and used to generate the switch current signal $V_{122}$. The switch current signal $V_{122}$ is compared to the carrier signal $V_{118}$ by the comparitor 119. When the switch current signal $V_{122}$ reaches the voltage level of the carrier signal $V_{118}$, the comparitor output $V_{119}$ resets the flip flop 123 and the power switch 112 is turned off, thus ending the switch cycle. FIG. 7 $V_{123}$ and $V_{124}$ shows the relationship between the duty ratio D and the switching period $T_s$. This process maintains the input current $i_{101}$ at the same phase and frequency as the input voltage $V_{101}$. The output load 115 is also supplied with the output current $i_{115}$ required to maintain the output voltage $V_{115}$ at the same level as the reference voltage $V_{114}$. An optional zener diode 130 placed on the carrier signal $V_{118}$ will limit the power transistor current $i_{112}$ to a desired maximum current.

Peak Current Non-Linear Carrier Waveform Generator

The key component of the peak current non-linear carrier modulator of FIG. 6 is the generator of the nonlinear carrier waveform $v_c(t) = (v_m + Kt/T_s)(1-t/T_s)$, where $v_m$ is a slowly-varying modulating input, and $T_s$ is the switching period.

Figure 8:
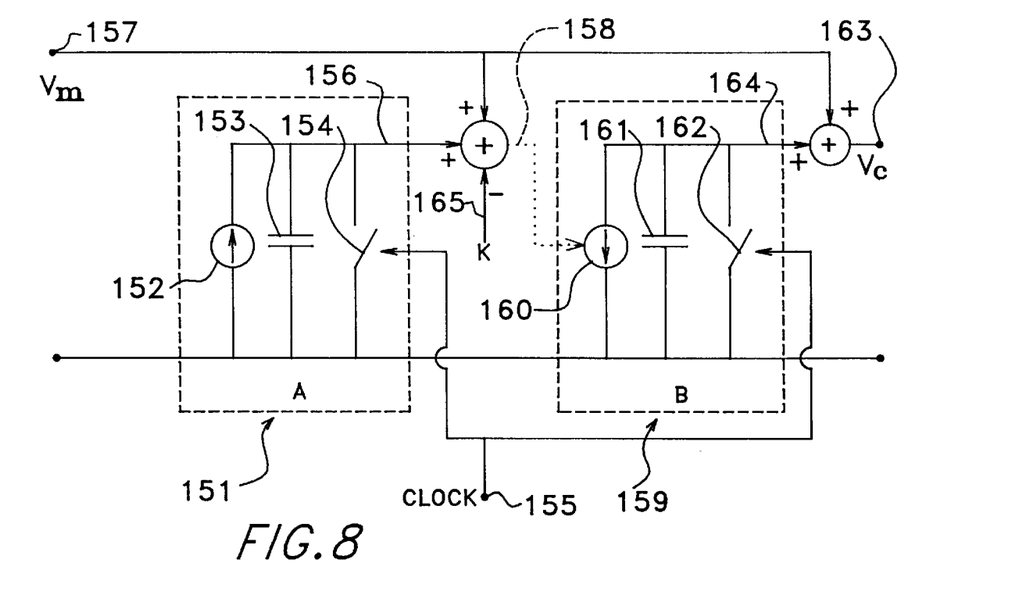
FIG. 8 is a block diagram of carrier generator for the charge non-linear carrier controller of FIG. 6.

Various circuit techniques can be used to synthesize the signal $v_c(t)$. Here, a simple method based on integration of a linear ramp signal is described. A block diagram of the $v_c(t)$ generator 118 of FIG. 6 is shown in FIG. 8, together with waveforms illustrating the operation shown in FIG. 9.

Figure 9:
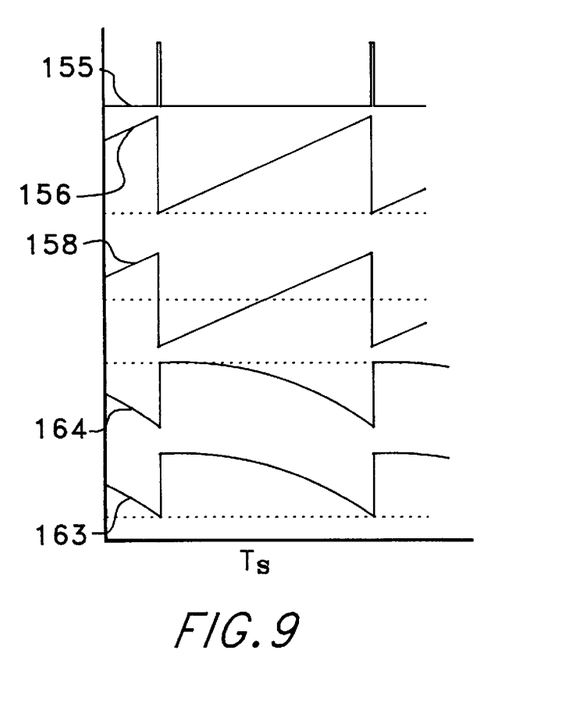
FIG. 9 is the key waveforms of the modulator of FIG. 8.

If the desired waveform $V_c(t)$ 163 is differentiated, we get $$V_c = \left(V_m + \frac{Kt}{T_s}\right)\left(1 - \frac{t}{T_s}\right) = V_m + (K - V_m)\left(\frac{t}{T_s}\right) - K\left(\frac{t}{T_s}\right)^2$$

$$\dot{V}_c = \frac{K - V_m}{T_s} - \frac{2Kt}{T_s^2}$$

First a linear ramp signal 156 $v_1(t) = 2K(t/T_s)$ is generated by an integrator with reset 151 using a current source 152 charging a capacitor 153. The capacitor 153 is discharged to zero using a switch 154 controlled by the clock input signal 155. The output of the integrator with reset 151 is the linear ramp signal 156 $V_1$.

The second step is to add $V_m$ 157 and subtract K 165 from $v_1(t)$ 156 obtaining $V_2$ 158, as shown in the block diagram. Next, $v_3(t)$ 164 is obtained by integrating $v_2(t)$ 158, $$V_1 = \frac{2Kt}{T_s}$$

$$V_2 = V_1 + Vm - K$$

$$\dot{V}_c = -\frac{1}{T_s} V_2$$

$$V_3 = -\frac{1}{T_s} \int_0^t V_2(\tau)d\tau \quad 0 < t < T_s$$

$$V_c = V_3 + V_m$$

which is the function of the second integrator with reset 159 comprising controlled current source 160, capacitor 161, and switch 162.

Finally, $V_c$ 163 is obtained by adding the modulating input $V_m$ 157 to $V_3$ 164.

Both integrators 151 and 159 are reset to zero by the clock signal 155 at the beginning of every switching cycle to ensure the correct zero initial conditions.

The block diagram of the circuit shown in FIG. 2 has been implemented in a bread-board.

Figure 10:
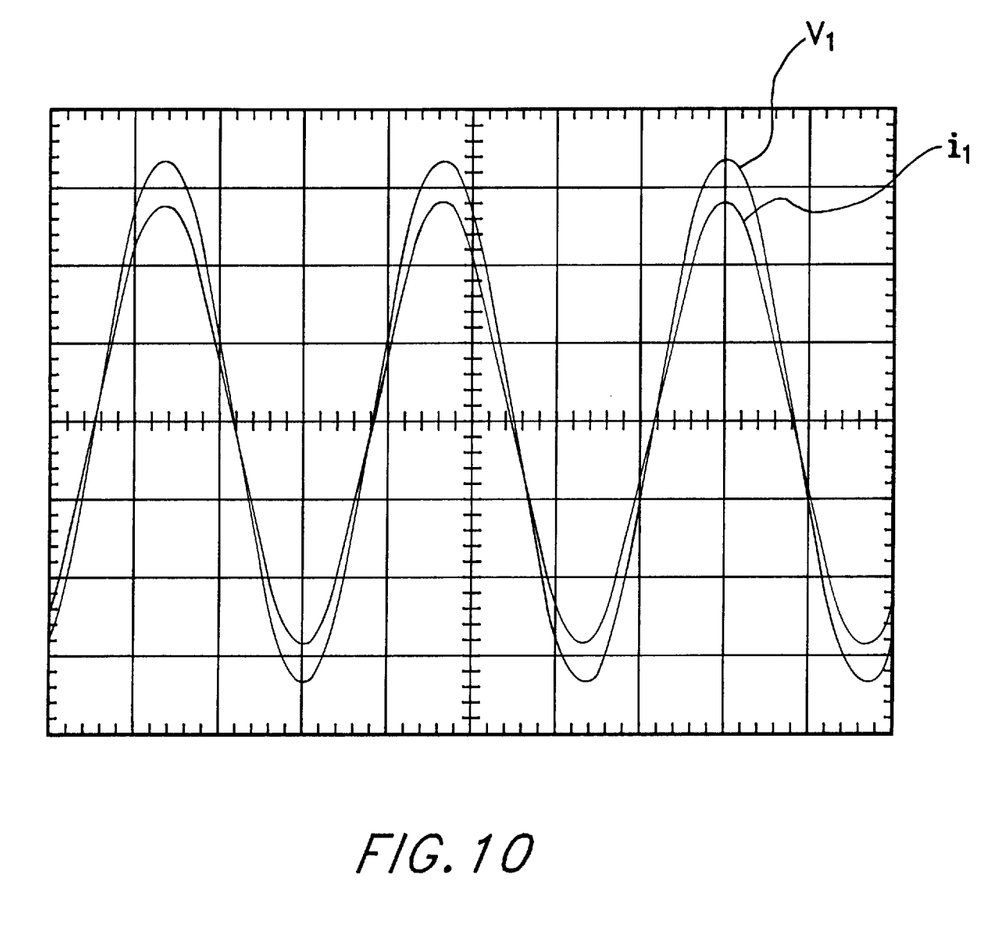
FIG. 10 shows the input current and voltage of the breadboard circuit.

FIG. 10 shows an oscilloscope trace of the input current $i_1$ and the input voltage $V_1$ of the breadboard on channel 1 and channel 2 respectively.

The scale factor for channel 1 is 1A/div. The scale factor for channel 2 is 50V/div. The figure shows that the input phase and frequency are the same. Thus, unity power factor has been achieved.

Figure 11:
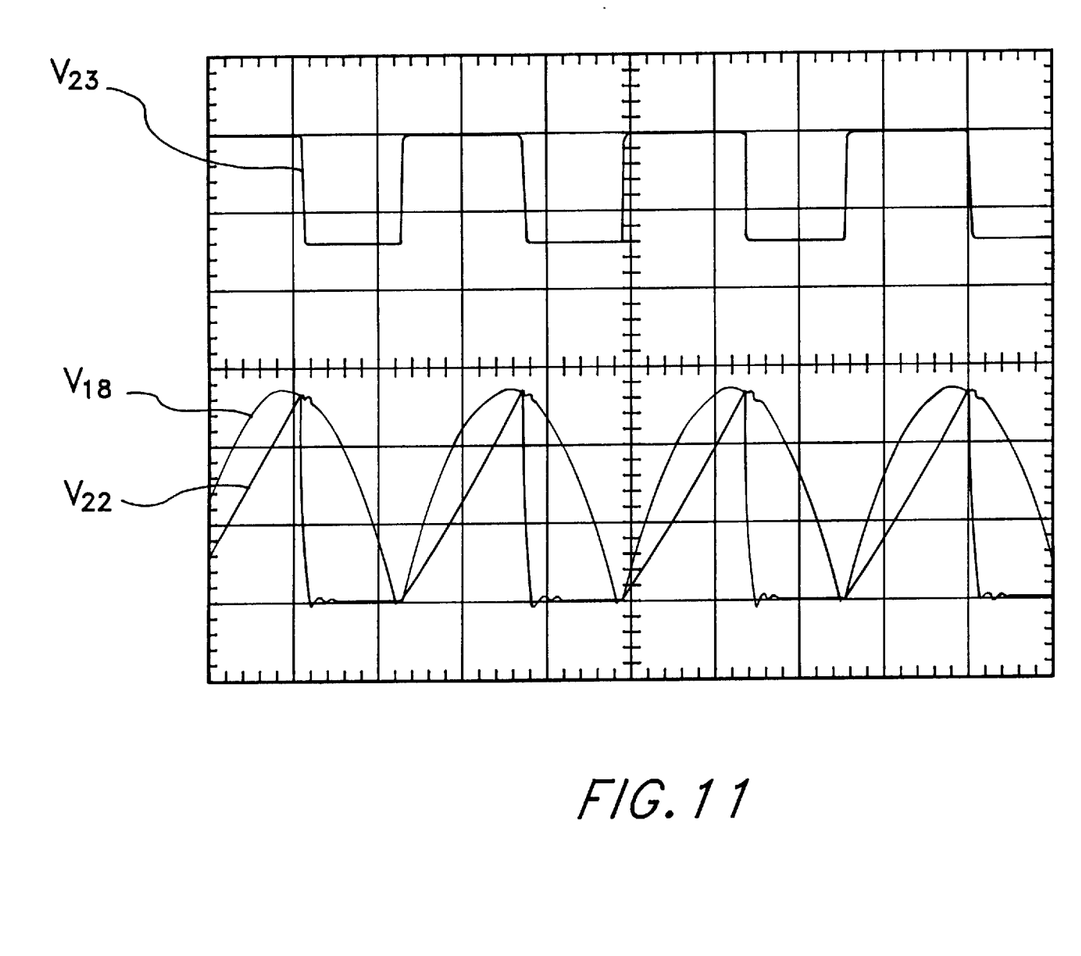
FIG. 11 shows the transistor drive voltage, and the input to the comparitor of the breadboard circuit of FIG. 10.

FIG. 11 shows the measured values of the carrier generator output $V_{18}$, the integrated switch current $V_{22}$, and the resultant input to the gate driver $V_{23}$. These waveforms are the same as the predicted waveforms shown in FIG. 3.

Although the present invention has been described with reference to preferred embodiments, numerous modifications and variations can be made and still the result will come within the scope of the invention. No limitation with respect to the specific embodiments disclosed herein is intended or should be inferred.

I claim:

1. In a boost rectifier a method to emulate a resistive load on the input power line comprising the steps of:

sensing a current of a switching means which is located inside the rectifier;

integrating the sensed switch current to compute a voltage ($V_q$);

sensing a negative of the rectifier output voltage and summing it with a reference voltage thereby yielding an error voltage;

amplifying the error voltage with a voltage loop error amplifier to obtain a carrier generator input voltage ($V_m$);

generating a non-linear carrier waveform ($V_c(t)$) whose amplitude is proportional to the carrier generator input voltage ($V_m$) according to the formula:

$$v_c(t) = v_m \frac{t}{T_s} \left( 1 - \frac{t}{T_s} \right),$$

where t=time from the beginning of the switching period and $T_s$=the switching period;

using a clock to set a flip flop to turn on the switching means at the beginning of each switching period; and comparing Voltage ($V_q$) with non-linear carrier waveform ($V_c(t)$) and resetting the flip flop to turn off the switching means when ($V_q$) exceeds ($V_c(t)$).

2. In a boost rectifier a method to emulate a resistive load on the input power line comprising the steps of:

sensing a current of a switching means which is located inside the rectifier, producing a voltage ($V_s$) proportional to the current of the switch means;

sensing a negative of the rectifier output voltage (V) and summing it with a reference voltage thereby yielding an error voltage;

amplifying the error voltage with a voltage loop error amplifier to obtain a carrier generator input voltage ($V_m$);

generating a non-linear carrier waveform ($V_c(t)$) whose amplitude is proportional to the carrier generator input voltage ($V_m$) according to the formula: $V_c(t)=(V_m+Kt/T_s)(1-t/T_s)$ where $T_s$=the switching period and t=time from the beginning of the switching period, $K=VR_s/2Lf_s$ where V=the output voltage of the boost rectifier, $R_s$=the switch current sense resistor, L=the series inductor of the boost rectifier, and $f_s$=the switching frequency;

using a clock to set a flip flop to turn on the switching means at the beginning of each switching period; and comparing Voltage ($V_s$) with parabolic carrier waveform ($V_c(t)$) and resetting the flip flop to turn off the switching means when ($V_s$) exceeds ($V_c(t)$).

3. The process of claim 2 further comprising the step of limiting the current of the switching means by means of adding a zener diode between the output of the carrier generator ($V_c(t)$) and ground.

4. In a boost rectifier an apparatus to emulate a resistive load on the input power line comprising:

means for sensing a current of a switching means which is located inside the rectifier;

means for integrating the sensed switch current to compute a voltage ($V_q$);

means for sensing a negative of the rectifier output voltage and summing it with a reference voltage thereby yielding an error voltage;

means for amplifying the error voltage with a voltage loop error amplifier to obtain a carrier generator input voltage ($V_m$);

means for generating a non-linear carrier waveform ($V_c(t)$) whose amplitude is proportional to the carrier generator input voltage ($V_m$) according to the formula:

$$v_c(t) = v_m \frac{t}{T_s} \left( 1 - \frac{t}{T_s} \right),$$

where t=time from the beginning of the switching period and $T_s$=the switching period;

means for using a clock to set a flip flop to turn on the switching means at the beginning of each switching period; and means for comparing Voltage ($V_q$) with non-linear carrier waveform ($V_c(t)$) and resetting the flip flop to turn off the switching means when ($V_q$) exceeds ($V_c(t)$).

5. In a boost rectifier an apparatus to emulate a resistive load on the input power line comprising:

means for sensing a current of a switching means which is located inside the rectifier, producing a voltage ($V_s$) proportional to the current of the switch means;

means for sensing a negative of the rectifier output voltage (V) and summing it with a reference voltage thereby yielding an error voltage;

means for amplifying the error voltage with a voltage loop error amplifier to obtain a carrier generator input voltage ($V_m$);

means for generating a non-linear carrier waveform ($V_c(t)$) whose amplitude is proportional to the carrier generator input voltage ($V_m$) according to the formula: $V_c(t)=(V_m+Kt/T_s)(1-t/T_s)$ where $T_s$=the switching period and t=time from the beginning of the switching period, $K=VR_s/2Lf_s$ where V=the output voltage of the boost rectifier, $R_s$=the switch current sense resistor, L=the series inductor of the boost rectifier, and $f_s$=the switching frequency;

means for using a clock to set a flip flop to turn on the switching means at the beginning of each switching period; and means for comparing Voltage ($V_s$) with non-linear carrier waveform ($V_c(t)$) and resetting the flip flop to turn off the switching means when ($V_s$) exceeds ($V_c(t)$).

6. The apparatus of claim 5 further comprising means for limiting the current of the switching means by means of adding a zener diode between the output of the carrier generator ($V_c(t)$) and ground.

7. The apparatus of claim 4 wherein said current sensing means further comprises a sense resistor.

8. The apparatus of claim 4 wherein said integrating means further comprises an integrator with a reset switch.

9. The apparatus of claim 4 wherein the means for sensing a negative of the rectifier output voltage, and summing it with a reference voltage thereby yielding an error voltage, and a means for amplifying the error voltage further comprises an amplifier.

10. The apparatus of claim 4 wherein said means for generating a non-linear carrier waveform ($V_c(t)$) according to the formula, $$V_c(t) = V_m \frac{t}{T_s} \left(1 - \frac{t}{T_s}\right)$$

further comprises a circuit comprising:

- a first current source controlled by the generator input voltage ($V_m$);
- a summing junction having a positive and a negative input, and an output;
- said generator input voltage ($V_m$) connected to said negative input of said summing junction, and to a point of reference potential;
- said first current source connected between said positive input to said summing junction and said point of reference potential;
- a first capacitor connected between said positive input to said summing junction and said point of reference potential;
- a switch controlled by an external clock and connected between said positive input to said summing junction and said point of reference potential;
- a second current source controlled by said output of said summing junction;
- said current source connected between said non-linear carrier waveform $V_c(t)$ and said point of reference potential;
- a second capacitor connected between said non-linear carrier waveform $V_c(t)$ and said point of reference potential; and
- a second switch controlled by an external clock and connected between said non-linear carrier waveform $V_c(t)$ and said point of reference potential.

11. The apparatus of claim 5 wherein said current sensing means further comprises a sense resistor.

12. The apparatus of claim 5 wherein the means for sensing a negative of the rectifier output voltage, and summing it with a reference voltage thereby yielding an error voltage, and a means for amplifying the error voltage further comprises an amplifier.

13. The apparatus of claim 5 wherein said means for generating a non-linear carrier waveform ($V_c(t)$) according to the formula, $$V_c(t) = \left(V_m + \frac{kt}{T_s}\right)\left(1 - \frac{t}{T_s}\right),$$

further comprises:

- a first current source;
- a first and second summing junction each having positive and negative inputs, and each has an output;
- said generator input voltage ($V_m$) connected to a positive input to said first and second summing junction, and to a point of reference potential;
- said K further comprising a connection to the negative input of said first summing junction;
- said first current source connected between a second positive input to said first summing junction and said point of reference potential;
- a first capacitor connected between said second positive input to said first summing junction and said point of reference potential;
- a switch controlled by an external clock and connected between said second positive input to said first summing junction and said point of reference potential;
- a second current source controlled by said output of said first summing junction;
- said current source connected between a second positive input to said second summing junction and said point of reference potential;
- a second capacitor connected between said second positive input to said second summing junction and said point of reference potential;
- a second switch controlled by an external clock and connected between said second positive input to said second summing junction and said point of reference potential; and
- the output of said second summing junction further comprises the non-linear carrier waveform ($V_c(t)$).

* * * * *